United States Patent Office 2,920,121
Patented Jan. 5, 1960

2,920,121

PROCESS FOR RECOVERY OF NAPHTHALENE FROM SULFONIC ACID SOLUTIONS

William E. Sisco, Bound Brook, and Melvin I. Moyer and Popkin Shenian, Plainfield, N.J.

No Drawing. Application December 13, 1957
Serial No. 702,531

4 Claims. (Cl. 260—674)

This invention relates to an improved method of treating the aqueous effluent from the refining of naphthalene and the production of derivatives involving sulfonation of naphthalene, and in a more specific aspect to an improved method of refining crude naphthalene.

In the ordinary refining of naphthalene by acid washing followed by washing with water or aqueous solutions, there is produced an aqueous effluent which contains sulfonic acids of naphthalene and its impurities and which presents a serious pollution problem because the effluent is high in organic material and, if discharged into streams, even if neutralized, results in a serious increase in biological oxygen demand (BOD). At the same time, there is a substantial loss of naphthalene which may amount to from 5–10%.

The present invention permits a simple removal of practically all of the organic matter from the effluent and at the same time results in a recovery of high-grade naphthalene which would otherwise be lost. In a more specific aspect, the invention includes an improved refining process for naphthalene, which eliminates one of the steps formerly considered necessary, while at the same time producing an aqueous effluent which is substantially free from organic matter. Essentially the process involves the heating, normally under pressure, of aqueous effluents containing naphthalene sulfonates with acid catalysts which favor hydrolysis and polymerization of heterocyclic and similar polymerizable impurities. In the case of the refining of naphthalene this treatment can be substituted for the ordinary sulfuric acid washing by heating in the presence of an aqueous solution of acid catalyst under conditions where sulfonation does not take place or where the equilibrium between sulfonation and hydrolysis of sulfonic acids is at a point where no substantial amounts of sulfonates can remain.

For example, ordinary crude coal tar naphthalene contains substantial amounts of thionaphthenes and in some cases, some coumarone and indene compounds. The ordinary sulfuric acid wash results in a polymerization and sulfonation of some of these impurities, but, unfortunately, there results some sulfonation of naphthalenes and thionaphthenes which constitutes a loss as well as an effluent problem. Water or dilute alkaline washes of the acid-washed naphthalene remove the sulfonates as an effluent which presents a disposal and pollution problem because of the presence of organic matter and resulting high BOD. Similarly, in the production of β-naphthol, which involves sulfonation of naphthalene, there results an aqueous effluent containing some naphthalene and thionaphthene sulfonates.

The process of the presentation has been found to completely hydrolyze naphthalene sulfonates to naphthalene and to hydrolyze and polymerize impurities, such as sulfonated thionaphthenes. As a result, two layers can be formed, one a naphthalene layer containing the polymerized impurities and an aqueous layer which is substantially free from, or very low in, organic matter and which, if necessary after neutralization by liming, can be discharged into streams without raising any problem of excessive BOD or can be otherwise utilized. The naphthalene after separation is then distilled, resulting in the recovery of high-grade naphthalene and producing a still residue of polymers, tars and coke which can be disposed of readily since it is in concentrated form and not distributed throughout a large volume of aqueous effluent. The savings resulting from the recovery of high-grade naphthalene go far toward paying the whole cost of effluent treatment and under favorable circumstances will yield a moderate profit.

In order to retain the great economic advantages of the high-grade naphthalene recovery, the heating at the temperatures preferably obtained by using pressure must be continued until the polymerizable impurities are substantially completely polymerized. Unpolymerized thionaphthenes will contaminate the recovered napthalene and render it of little value. Thus, if atmospheric pressure prevails in the heating step, polymerization will be so incomplete in any reasonable time that the recovered naphthalene will be very high in sulfur and in a typical case will be of not more than about 75% purity.

In a few situations where the effluent problem is not so severe and a somewhat lower grade of naphthalene can be accepted, time can be shortened and a small amount of impurities may be permitted to remain unpolymerized. Such cases represent an economic compromise with optimum results and are, of course, included in the invention.

The acid catalyst to be used in the present invention is not limited to sulfuric acid, but, as this is normally present in effluents, at least from ordinary naphthalene refining, and in any event is very cheap, it is the preferred catalyst and the invention will be further described in connection with the use of sulfuric acid followed by a brief discussion of modifications which are required if other acid catalysts such as phosphoric or hydrochloric acid are used.

Theoretically, almost any concentration of sulfuric acid could be employed, which is below that at which there is considerable sulfonation. However, practically and especially, in the case of effluent treatment, certain manipulative considerations dictate a practical range which is preferred. Where separation of aqueous and naphthalene layers is effected, the lower limit of sulfuric acid concentration is that at which the aqueous acid layer is sufficiently heavier than the naphthalene layer so that a clean separation takes place without emulsification or other difficulties which are encountered when the specfic gravity of the aqueous layer is too low. In general, the gravity should be at least that corresponding to 10% sulfuric acid and, preferably, 30%, in other words, specific gravity under standard conditions of at least 1.07. Where there are present other inorganic salts, such as sodium sulfate and the like, a satisfactory gravity may be obtained with somewhat less sulfuric acid, but, in general, it is undesirable to go materially below 10% sulfuric acid, even if the gravity is brought up with other inorganic salts. It should be noted that the concentration of acid and specific gravity applies to the aqueous layer produced in the hydrolysis.

The upper limit of sulfuric acid concentration is also a practical one and we have found that for good separation, the sulfuric acid concentration initially should not exceed 50%. During the process there may be a slight loss of water at times from evaporation but care should be taken that there is not sufficient loss to result in a concentration of sulfuric acid which would permit any significant amounts of sulfonation.

It is an advantage of the present invention that the temperature is not critical. The temperature, however, should be in the range of 175-350° C., as no practically usable results are obtained at lower temperatures.

When the process is to be applied to crude naphthalene without preliminary acid washing rather than to effluents from the refining process, it is possible to eliminate the whole step of acid washing. When naphthalene is to be refined directly, the upper limit of sulfuric acid concentration may be a little higher than 50%, but there is no advantage, and it is preferred to maintain the concentration within the same limits as specified for the effluent treatment modification described above. In no event, of course, should the sulfuric acid concentration be sufficiently high to produce substantial sulfonation.

It is an advantage that the dilute sulfuric acid, which is present in the heating step of the present invention, need not be pure. As has been pointed out above, there may be present other inorganic compounds either as a result of earlier treatment or deliberate addition. The fact that a very impure sulfuric acid can be employed is of particular significance in the modification in which naphthalene is directly refined by heating with the dilute acid, separating layers and distilling off the naphthalene from the polymerized tars and other nonvolatile organic constituents. It is quite possible to reuse the same dilute acid for a number of batches of crude naphthalene, permitting very substantial additional economy. Eventually, of course, contaminants build up to the point where the sulfuric acid can no longer be reused, but the number of reuses of the acid is sufficiently high so that the acid cost of refining naphthalene by the process of the present invention becomes extremely small. As a matter of fact, in many cases the acid can be reused continuously because mechanical losses require the addition of small amounts of makeup and with some crude naphthalenes, this is sufficient to prevent the accumulation of excessive amounts of contaminants. In such cases continuous naphthalene refining processes become possible.

As has been mentioned above, sulfuric acid is not the only acid catalyst which can be used to promote polymerization of thionaphthenes and similar polymerizable constituents. Other acid catalysts such as phosphoric or hydrochloric may be used and where materials are available at very low cost, for example where there is waste phosphoric or hydrochloric acid from other operations, their use is included in the present invention. The greater corrosive effects of the acid, however, renders it much less desirable than sulfuric acid. Phosphoric acid presents no additional problem with respect to specific gravity or corrosion and here its use is purely a matter of cost which renders it economical only under rare circumstances where very cheap waste phosphoric acid is obtainable. Its use is, of course, included in the broad aspects of the invention. Needless to say, the acid catalyst may be mixed, for example mixtures of sulfuric and phosphoric acid are entirely satisfactory.

The invention will be described in greater detail in connection with the following specific examples.

*Example 1*

2000 parts of sulfuric acid-washed naphthalene are extracted twice with separate portions of 100 parts of water. The combined sulfuric and sulfonic acid concentration resulting is about 35%. The naphthalene is then washed with 10% aqueous caustic to remove the last traces of acid and the water extracts mixed and heated in an autoclave at 300° C. until hydrolysis and polymerization of thionaphthene sulfonates is complete. On cooling a black solid mass is obtained from which 280 parts of an aqueous effluent is separated. This effluent cotnains only about 1% as much oxidizable organic matter as the original extracts.

The black mass is dissolved in 100 parts of toluene, heated and filtered. About 30 parts of a charry residue is separated and the toluene solution then distilled, yielding 80 parts of naphthalene of 95-97% purity and 5 parts of tarry residue.

*Example 2*

The procedure of Example 1 is followed but the caustic wash is added to the combined water extracts. The effluent obtained has approximately the same organic content but the recovery of naphthalene is increased somewhat.

*Example 3*

The procedure of Examples 1 and 2 is followed through the hydrolysis and the product is then steam stripped until the 80 parts of naphthalene distiils over. The remaining tarry residue is separated from the remaining effluent which has approximately the same organic content as the effluent from Example 1.

*Example 4*

A sodium sulfate brine containing 15% of sulfonic acids of crude naphthalene is treated with an amount of sulfuric acid equivalent to 1 mol per mol of the sulfonic acids and the sodium sulfate. The acid brine is then heated under pressure at a temperature of about 200-250° C. until hydrolysis is complete and the thionaphthenes present polymerized to tarry material. The mixture is then stream stripped as described in Example 3. Substantially all of the naphthalene content of the mixed sulfonic acids is recovered at 97% pure naththalene.

*Example 5*

1000 parts of crude coal tar naphthalene of about 95% purity is agitated with 500 parts of 30% sulfuric acid at 250° C. until polymerization of the polymerizable impurities is substantially complete. The reaction mixture is cooled and 990 parts of naphthalene containing charred material separated from an aqueous effluent. This crude naphthalene is then batch distilled yielding 920 parts of naphthalene better than 98% purity. The aqueous effluent has a content of organic matter substantially the same as that of the effluent from Example 1.

*Example 6*

1000 parts of crude coal tar naphthalene of about 95% purity is agitated with 1000 parts of 60% sulfuric acid at 175° C. for a 24-hour period. The reaction mixture is cooled, and about 990 parts of naphthalene containing some charred material is separated from the aqueous effluent. The crude naphthalene separated from the charred material is then batch distilled, yielding about 920 parts of naphthalene of better than 97% purity.

*Example 7*

The process of Example 6 is repeated except that the mixture is agitated at a temperature of 160° C. instead of 175° C. No practically useful increase in purity was detected, the product obtained still being of approximately 95% purity.

This application is in part a continuation of our copending application Serial No. 539,932, filed October 11, 1955, now abandoned.

We claim:

1. In reducing the biological oxygen demand of and recovering naphthalene from an aqueous effluent mixture containing naphthalene sulfonates and sulfonates of polymerizable impurities of crude naphthalenes including sulfonates of thionaphthenes, said mixture resulting from treating naphthalene with aqueous liquors, the treatment which comprises: adding to said effluent mixture, as a polymerization catalyst, an amount of an acid selected from the group consisting of sulfuric, phosphoric and hydrochloric sufficient to produce an acid concentration from 10% to about 50% but below that at which substantial amounts of soluble naphthalene salts are formed; heating the mixture at temperatures of from about 175° to about 350° C., whereby hydrolysis of the sulfonates and polymerization of resulting polymerizable thionaphthenes are initiated; continuing said heating until said reactions are substantially complete; cooling the so-treated mixture, whereby the mixture separates into an aqueous phase and a naphthalene-containing organic phase; during said treatment, producing in said mixture a sufficient content of inorganic material that said separated aqueous phase has a specific gravity of at least 1.07; and collecting the organic phase.

2. In reducing the biological oxygen demand of and recovering naphthalene from an aqueous effluent mixture containing naphthalene sulfonates and sulfonates of polymerizable impurities of crude naphthalenes including sulfonates of thionaphthenes, said mixture resulting from treating naphthalene with aqueous liquors, the treatment which comprises: adding to said effluent mixture, an amount of sulfuric acid sufficient to produce an acid concentration from 10% to about 50%, but below that at which substantial amounts of naphthalene sulfonate are formed; heating the mixture at temperatures of from about 175° to about 350° C., whereby hydrolysis of the sulfonates and polymerization of resulting polymerizable thionaphthenes are initated; continuing said heating until said reactions are substantially complete; cooling the so-treated mixture, whereby the mixture separates into an aqueous phase and a naphthalene-containing, organic phase; during said treatment, producing in said mixture a sufficient content of inorganic material that said separated aqueous phase has a specific gravity of at least 1.07; and collecting the organic phase.

3. A process according to claim 2 in which at least part of the aqueous dispersion is produced by washing acid-washed crude naphthalene with an aqueous solution.

4. A process according to claim 2 in which at least part of the aqueous mixture containing the sulfonic acids is produced by aqueous washing of sulfuric acid-washed crude naphthalene.

References Cited in the file of this patent
UNITED STATES PATENTS

| | | |
|---|---|---|
| 1,441,417 | Gould | Jan. 9, 1923 |
| 1,819,680 | Hill | Aug. 18, 1931 |
| 2,774,800 | Shmidl et al. | Dec. 18, 1956 |

OTHER REFERENCES

Chem. Abs., vol. 49, 6894e (1955). Original article Shornik Statei Khim., vol. 2, 882–886 (1953).